R. ABELL.
COASTER BRAKE.
APPLICATION FILED MAR. 17, 1919.
1,413,952.
Patented Apr. 25, 1922.
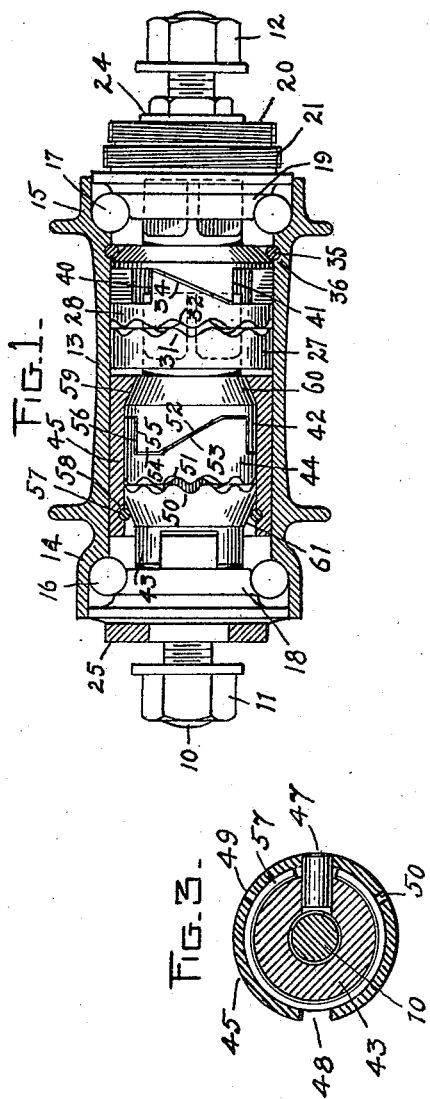
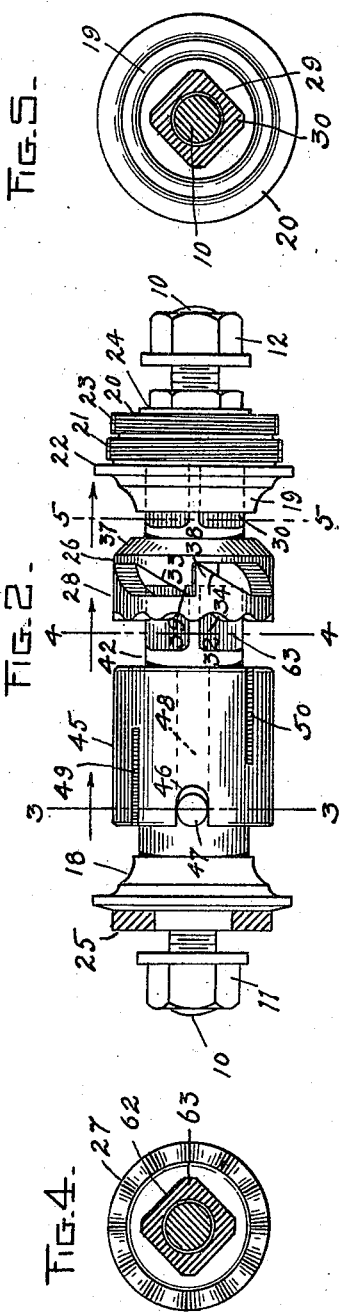
Inventor:
Rollin Abell,
by Emry, Booth, Janney & Varney
Attys.

UNITED STATES PATENT OFFICE.

ROLLIN ABELL, OF MILTON, MASSACHUSETTS.

COASTER BRAKE.

1,413,952.  Specification of Letters Patent.  Patented Apr. 25, 1922.

Application filed March 17, 1919. Serial No. 283,125.

*To all whom it may concern:*

Be it known that I, ROLLIN ABELL, a citizen of the United States, and a resident of Milton, county of Norfolk, and State of Massachusetts, have invented an Improvement in Coaster Brakes, of which the following description, in connection with the accompanying drawings, is a specification, like characters on the drawings representing like parts.

This invention relates to coaster brakes for bicycles and the like, and aims to provide a positive and reliable action, to prevent transmission of end thrusts of the driving and braking mechanism to the bearings, to prevent the pedals from turning when the bicycle is rolled backward with the driving clutch engaged, to provide a simple and durable mechanism, and to facilitate its manufacture.

My invention will be best understood by reference to the following description, when taken in connection with the accompanying drawings of a specific coaster brake mechanism selected for exemplification, while its scope will be more particularly pointed out in the appended claims.

In the drawings:

Fig. 1 is a central, longitudinal section, partly in elevation, of a coaster brake embodying my invention;

Fig. 2 is an elevation of the driving clutch and braking mechanism, exclusive of the driven member and the hood;

Fig. 3 is a sectional view on line 3—3 of Fig. 2;

Fig. 4 is a sectional view on line 4—4 of Fig. 2; and

Fig. 5 is a sectional view on line 5—5 of Fig. 2.

Referring to the drawings and to the embodiment of my invention which is illustrated therein, I have selected for exemplification a coaster brake comprising a usual axle 10, which in practice will be mounted in the rear fork of a bicycle frame and secured therein by usual nuts 11 and 12 threaded onto said axle.

A usual hub 13 is suitably supported on the axle 10, and to that end is herein provided with usual ball-races 14 and 15 for two sets of balls 16 and 17, which also run on inner ball-races 18 and 19. The latter is herein formed as a part of a driving element 20, which in practice will be driven by a usual chain or other mechanism. In case of a chain drive, the driving element 20 is provided with a screw-threaded portion 21, on which the usual sprocket wheel (not shown) is threaded. The sprocket wheel is customarily screwed against a shoulder 22, and is held against turning movement thereon by a usual nut (not shown) threaded onto a screw-threaded portion 23 of the driving element 20. The latter encircles and is mounted to turn on a usual bearing, including a collar 24 threaded onto the axle 10, and in practice is in the form of a cone providing an inner ball-race for a set of balls whose outer race is formed within the driving element 20. It is deemed unnecessary to show these parts in detail, because they may be, and preferably are, of usual and well-known construction.

In practice, one jaw of the rear fork of the frame will be clamped between the nut 11 and ball-race or cone 18, while the other jaw of the fork will be clamped between the nut 12 and ball-race or cone 24. The cone or ball-race 18, as will presently appear, has suitable non-rotatable connection with the fixed brake member, and in practice is held against turning movement by a brake arm 25, which is shown in section in the drawings, and in practice extends in the usual manner in a forward direction, and is secured to and held against turning movement by the rear fork of the frame in a manner which is too well known to require further description or illustration.

The forward driving of the hub 13 is accomplished by a driving clutch, herein comprising a driving member 26, a driven member 27, and an intermediate floating member 28. The driving member 26 is suitably coupled to the driving element 20, as by providing the latter (see Fig. 5) with a square opening 29 to receive a corresponding square shank 30, thereby to cause these two connected parts to turn as one, while still allowing them to move axially with relation to each other. The driven member 27 is herein in the form of a ring suitably secured to and carried by the hub 13. The intermediate member 28 is also in the form of a ring and is supported by the hub 13, but mounted to turn freely therein.

The driven member 27 and intermediate member 28 are provided on their confronting faces with suitable interengaging means for effecting a positive drive of the hub in a forward direction, and to that end are herein provided with corrugations or undulations 31 and 32. In other words, the clutch surfaces are preferably in the form of shallow beveled, rounded teeth, engaging correspondingly-shaped depressions. This form is preferred for several reasons, among them being freedom from danger of stripping the teeth characterizing prior constructions.

Engagement of the clutching surfaces 31 and 32 is effected by relative lateral or axial movement of the clutch members, and provision is made to utilize turning movement of the driving member 26 to produce lateral or axial movement of the intermediate floating member 28. To this end, the driving and intermediate members 26 and 28 are herein provided with cooperating inclined surfaces 33 and 34, or rather a plurality of sets of such surfaces. The driving member 26 is suitably held against outward axial movement, as by the provision of a split retaining ring 35, sprung into an annular groove 36 provided in the hub 13, and serving as an abutment for a beveled surface 37 on the driving member 26. When, therefore, the driving member 26 is rotated in the forward direction, its rotation is at first accompanied by axial or lateral movement of the floating intermediate member 28, thus causing interengagement of the clutching surfaces 31 and 32, whereupon the clutch members 26, 27 and 28, rotate as a unit, and the hub 13 is driven in a forward direction.

It should here be observed that the inclined wedging surfaces 33 and 34 are herein formed on teeth 38 and 39, which are also provided with faces 40 and 41, preferably extending generally parallel with the axis, and further that the teeth are so spaced as to provide a suitable amount of free play between the position in which the inclined wedging surfaces 33 and 34 engage, and that position in which the axially-extending surfaces 40 and 41 engage. This is well illustrated in Fig. 2, which shows the surfaces 40 and 41 engaged. From an inspection of this view, it is evident that when the rider wishes the forward driving to cease, but does not wish to apply the brake,—that is to say, when he wishes to coast, the lost motion or free play just referred to permits a considerable range of movement of the pedals, without danger of applying the brake. It may be added that the thrust of the clutch is self-contained,—that is to say, no end thrust is transmitted to the bearings of the hub 13.

Turning now to the brake mechanism, the latter is a self-contained unit comprising a rotatable member 42, a fixed member 43, an intermediate floating member 44, and an expansible friction element in the form of a ring 45, encircling the members 42, 43 and 44, and interposed between said members and the internal surface of the hub 13.

The fixed member 43, as hereinbefore stated, is preferably non-rotatably connected with the ball-race 18, herein by having tongue and groove connection therewith, as shown in Fig. 1. Preferably, the expanding friction ring 45 is also held against rotation, and to that end is herein provided (see Fig. 2) with a slot 46, which receives a pin 47 secured to the member 43. In the present embodiment, the ring 45 is rendered expansible and contractible by being provided with a slot 48, preferably extending from end to end thereof, and two shorter slots 49 and 50 extending thereinto from opposite ends thereof, the inner ends of the shorter slots preferably extending somewhat beyond each other, as well illustrated in Fig. 2.

The brake-expanding mechanism resembles the clutch mechanism. The fixed and intermediate members 43 and 44 are provided with confronting clutching surfaces 50 and 51, which, like those of the clutch, are preferably corrugated or undulating. So, also, the driving and intermediate members 42 and 44 are provided with cooperating, inclined, wedging surfaces 52 and 53, formed on teeth 54, which are also provided with other cooperating surfaces 55 and 56, extending generally parallel with the axis. It should here be noted, however, that the inclined wedging surfaces 52 and 53 are inclined in the opposite direction to the inclined wedging surfaces 33 and 34 of the forward driving clutch. This is so because it is a rearward movement, or back-pedalling, which is to cause the application of the brake.

The thrust of the brake mechanism is self-contained, and to that end, the expanding friction ring 45 is herein provided at one end with an abutment in the form of a split ring 57, sprung into a groove 58 in the friction ring, and at its other end with an inclined abutment 59 in the form of an annular frusto-conical shoulder. The brake expanding mechanism is interposed between these abutments, and has suitable provision to utilize relative turning movement of the members 42 and 44 to produce radial enlargement or expansion of the encircling friction ring 45. To this end, the member 42 is herein provided with a tapered surface 60, cooperating with a correspondingly-tapered surface 59 of the friction ring 45. Preferably, also, the fixed member 43 is provided with a tapered surface 61 cooperating with a split ring 57. When, therefore, the member 42 is turned in a backward direction, the cooperating inclined surfaces 52 and 53 tend to move the floating intermediate member 44 laterally or axially toward the fixed member 43, thereby causing clutching engagement of the confronting clutching surfaces 50 and 51, whereupon rotation of the intermediate member ceases, and continued turning of the member 42 in the rearward direction naturally results in an axial reaction of the latter toward the right (Fig. 1), thus causing the inner tapered surface 60 to cooperate with the outer tapered surface 59 to expand the surrounding friction ring 45.

The control of the member 42 of the brake mechanism is preferably vested in the intermediate or secondary member 28 of the clutch mechanism, and to that end, said intermediate member is herein provided with a square opening 62, which receives a corresponding square shank 63 formed on the member 42. Thus it is evident that rotation of the intermediate member 28 of the driving clutch is imparted to the member 42 of the brake mechanism, while still allowing the member 42 to move laterally or axially. I desire to lay special emphasis upon the fact that the secondary element, to wit, the intermediate floating ring 28 of the driving clutch operates the primary member, to wit, the member 42 of the brake. I also wish to emphasize the fact that the driving and brake-expanding clutches, although thus connected, are entirely separate and distinct. For these reasons, when the bicycle is rolled backward, with the driving clutch engaged, the pedals will remain stationary, because there is no tendency to turn them since the clutches are so interconnected that engaging one disengages the other, and hence both cannot be engaged at once.

The general operation of the mechanism will be evident without further description. The assembling and dismounting of the mechanism can be accomplished with ease and rapidity. After the ball-bearings have been removed, all that remains to be done is to remove the split rings 35 and 57 from their respective grooves by the use of a suitable pointed implement, whereupon the driving clutch and brake mechanisms can be withdrawn in opposite directions.

Having thus described one embodiment of my invention, but without limiting myself thereto, what I claim and desire by Letters Patent to secure is:

1. A coaster brake comprising, in combination, a hub, bearings therefor at opposite ends thereof, axially operated driving and braking mechanism within said hub having endwise engageable and disengageable surfaces, and means to receive the axial thrust developed by engagement of said surfaces and to prevent the same from being transmitted to said bearings.

2. A coaster brake comprising, in combination, a hub, an axle extending therethrough, hub bearings supported by said axle at opposite ends of said hub, axially operated driving and braking mechanism within said hub, and means carried by said hub intermediate said mechanism and said bearings to receive the axial thrust of said mechanism.

3. A coaster brake comprising, in combination, a hub, bearings therefor, a brake-shoe within said hub, mechanism within said brake-shoe comprising two members free to rotate in the forward direction and having cooperating means operated by rearward turning of one of said members to cause relative axial displacement of said members thereby to expand said brake-shoe against said hub, and means to receive the axial thrust of said members and to prevent the same from being transmitted to said bearings.

4. A coaster brake comprising, in combination, a driving member, a driven member, and driving clutch and braking mechanism having an intermediate clutch element common to both and having its support directly on said driven member independently of said driving member.

5. A coaster brake comprising, in combination, a driving member, a driven member, and a driving clutch and brake mechanism operated by lateral pressure and including a floating member having splined connection with said brake mechanism and serving as an intermediate member for both said driving clutch and said brake mechanism, and operatively interposed between said driving member and said driven member on the one hand and between said driving member and said brake mechanism on the other hand.

6. A driving clutch comprising, in combination, driving, driven and intermediate members, said driving and intermediate members having surfaces engageable by relative turning movement in one direction to effect relative lateral displacement of said driving and intermediate members, and disengageable by relative turning movement in the opposite direction, said intermediate and driven members having endwise engaging clutching surfaces.

7. A driving clutch comprising, in combination, coaxially arranged driving and driven members, an intermediate floating member intermediate endwise opposed surfaces of said driving and driven members and supported by and adapted to clutch endwise with said driven member, and means between said driving and intermediate members to cause clutching engagement of such members on rotation of said driving member in one direction.

8. In a clutch operated by lateral pressure, the combination of coaxially arranged driving, driven and intermediate members, and bearings for said driven member, said driving and intermediate members being supported in concentric relation directly by said driven member but independently of each other and independently of said bearings.

9. In an expanding brake unit operated by lateral pressure, the combination of an expansible friction element having confronting abutments, and an actuating mechanism self-contained within said friction element between said abutments and including a member whose rotation expands said friction element.

10. In an expanding brake unit operated by lateral pressure, the combination of an expansible friction element having opposite abutments, and an actuating mechanism interposed between and held against outward movement by said abutments, said mechanism including a fixed member and two relatively rotatable members having cooperating means to cause expansion of said expansible friction element upon relative rotation of said relatively rotatable members.

11. In an expanding brake unit operated by lateral pressure, the combination of an expansible friction element having opposite abutments, and an actuating mechanism interposed between and held against outward movement by said abutments, said mechanism including a fixed member and two relatively rotatable members, said fixed member and one of said rotatable elements having cooperating clutching surfaces, said rotatable elements having cooperating means operated by their relative rotation relatively to move said rotatable members laterally to engage said clutching surfaces, said fixed member and the outer rotatable member having inclined surfaces to cause expansion of said friction element upon clutching engagement of said surfaces.

12. In an expanding brake unit operated by lateral pressure, the combination of an expansible friction element having opposite abutments, and an actuating mechanism interposed between and held against outward movement by said abutments, said mechanism, including a fixed member, a rotatable member, and an intermediate, floating, rotatable member, said fixed and intermediate, floating members having cooperating clutching surfaces, said rotatable members having means operated by other relative rotation relatively to move said rotatable members laterally to cause clutching engagement of said surfaces, and one of said members having means operated by relative lateral movement of said members to cause expansion of said friction element.

13. The combination of a pair of cooperating, positively-interengageable clutching members, including a driven member which when clutched to the other clutching member is continuously rotated thereby, a controlling member, and means operated by rotation of said controlling member to cause axial engaging movement of one of said clutch members relatively to the other, and consequent continuous rotation of said driven member.

14. In a power-transmitting mechanism, the combination of driving and driven clutch members having cooperating, positively-interengageable clutch members, a driving member, and means operated by rotation of said driving member to cause axial, engaging movement of one of said clutch members relatively to the other, and consequent continuous rotation of said driven member.

15. In a brake mechanism, the combination of a pair of cooperative, positively-interengageable clutching members, one of which is fixed as to rotary movement, a controlling member, means operated by rotation of said controlling member to cause relative, axial engaging movement of one of said clutching members relatively to each other, a rotary member, and means consequent upon interengagement of said clutching members to oppose a frictional resistance to rotation of said rotary member.

16. A coaster brake comprising, in combination, driving and driven members, a pair of cooperating, positively-interengageable clutch members, one carried by said driving member, a pair of cooperating positively-interengageable clutching members, one of which is fixed as to rotary movement, means operated by rotation of said driving member to cause relative, axial engaging movement of said clutch members, thereby to impart driving motion from said driving member to said driven member, means operated by reverse rotation of said driving member to cause relative, axial engaging movement of said clutching members, and means consequent upon interengagement of said clutching members to oppose a frictional resistance to rotation of said rotary member.

In testimony whereof, I have signed my name to this specification.

ROLLIN ABELL.